United States Patent
Huang (12) United States Patent (10) Patent No.: US 9,686,587 B2
(45) Date of Patent: Jun. 20, 2017

(54) PLAYBACK METHOD AND APPARATUS

(75) Inventor: Hung-Chi Huang, Taichung (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 610 days.

(21) Appl. No.: 13/609,874

(22) Filed: Sep. 11, 2012

(65) Prior Publication Data

US 2013/0322855 A1    Dec. 5, 2013

(30) Foreign Application Priority Data

Jun. 4, 2012    (TW) .............................. 101120003 A (51) Int. Cl.
| | |
|---|---|
| *H04N 5/92* | (2006.01) |
| *H04N 21/4402* | (2011.01) |
| *H04N 21/488* | (2011.01) |
| *H04N 21/81* | (2011.01) |

(52) U.S. Cl.
CPC .  *H04N 21/440236* (2013.01); *H04N 21/4886* (2013.01); *H04N 21/814* (2013.01)

(58) Field of Classification Search
USPC .................................. 386/244–246, 337–340
See application file for complete search history.

(56) References Cited

U.S. PATENT DOCUMENTS

| | | | | | |
|---|---|---|---|---|---|
| 4,275,381 | A | * | 6/1981 | Siegal ...................... | G06K 9/18 235/495 |
| 5,864,635 | A | * | 1/1999 | Zetts .................. | G06K 9/00416 382/187 |
| 5,903,668 | A | * | 5/1999 | Beernink ................ | G06K 9/222 382/187 |
| 6,128,434 | A | * | 10/2000 | Hirayama et al. ............ | 386/243 |
| 6,340,967 | B1 | * | 1/2002 | Maxted ............... | G06F 3/04883 345/156 |
| 6,874,018 | B2 | * | 3/2005 | Wu .............................. | 709/219 |
| 6,994,056 | B1 | * | 2/2006 | Boros ..................... | F23D 14/04 122/14.1 |
| 7,499,589 | B1 | * | 3/2009 | Cortopassi ......... | G06K 9/00429 382/186 |
| 2003/0200858 | A1 | * | 10/2003 | Xie ................................ | 84/609 |
| 2005/0089226 | A1 | * | 4/2005 | Chang .................... | G06K 9/222 382/181 |
| 2005/0270289 | A1 | * | 12/2005 | Momose ............... | G06T 11/203 345/443 |
| 2006/0140590 | A1 | * | 6/2006 | Murase et al. .................. | 386/96 |

(Continued)

FOREIGN PATENT DOCUMENTS

TW        I358237        2/2012

OTHER PUBLICATIONS

Taiwan Patent Office, "Office Action", Jan. 16, 2015.

*Primary Examiner* — Helen Shibru
(74) *Attorney, Agent, or Firm* — WPAT, PC; Justin King (57) ABSTRACT

A video/audio playback method is provided which can provide simultaneous, multi-language support for consumers of television and multimedia. The method includes steps of: receiving a first playback data and a second playback data; converting first character information in the first playback data into a first audio signal; and simultaneously playing the first audio signal, and a second audio signal corresponding to the second playback data. The first audio signal and the second audio signal respectively correspond to a first playback language and a second playback language.

22 Claims, 6 Drawing Sheets

(56) References Cited

U.S. PATENT DOCUMENTS

| | | | |
|---|---|---|---|
| 2007/0065787 A1* | 3/2007 | Raffel | A63F 9/00 434/177 |
| 2007/0177801 A1* | 8/2007 | Kawamoto | A63F 13/10 382/187 |
| 2007/0261084 A1* | 11/2007 | Smith et al. | 725/86 |
| 2008/0232690 A1* | 9/2008 | Saund | G06F 3/04883 382/187 |
| 2009/0213085 A1* | 8/2009 | Zhen | G06F 3/04883 345/173 |

* cited by examiner

PLAYBACK METHOD AND APPARATUS

This application claims the benefit of Taiwan application Serial No. 101120003, filed Jun. 4, 2012, the subject matter of which is incorporated herein by reference.

BACKGROUND OF THE INVENTION

Field of the Invention

The invention relates in general to a multimedia playback method and apparatus, and more particularly to a multimedia playback method and apparatus capable of simultaneously playing several playback languages.

Description of the Related Art

Figure 1:
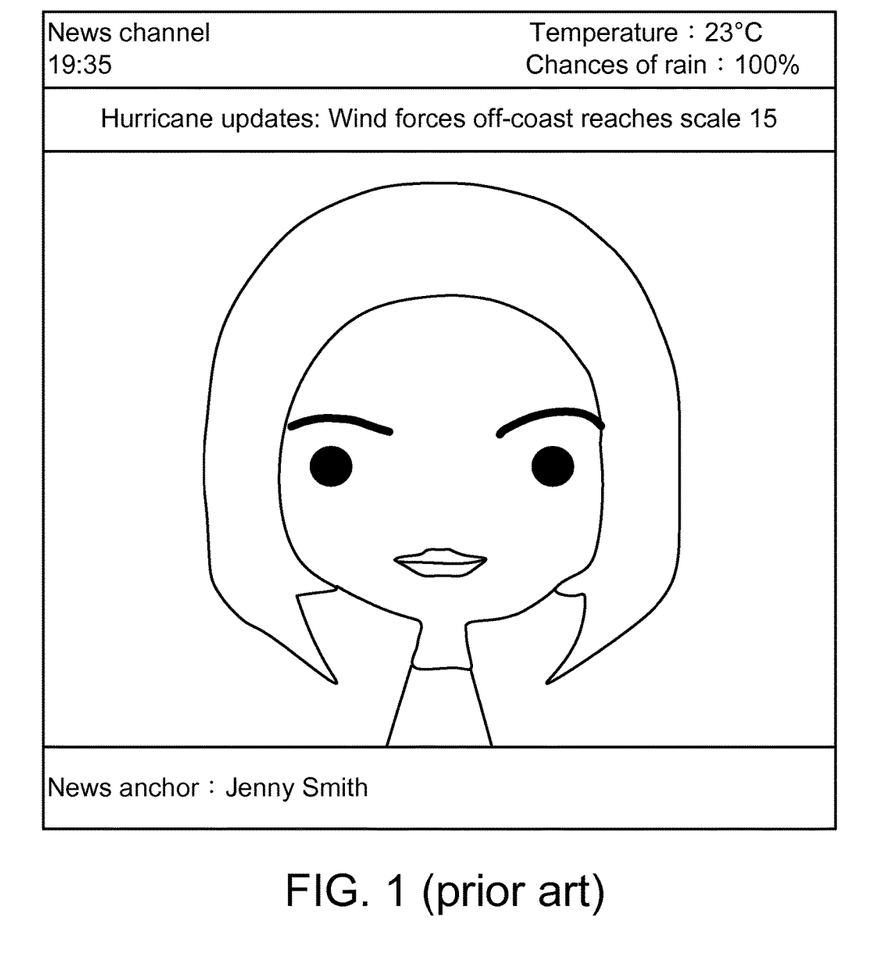
FIG. 1 is a schematic diagram of a presentation of a television program in the prior art.

FIG. 1 shows a schematic diagram of a presentation of a television program in the prior art. Taking broadcasting television news for example, apart from the news being broadcasted by a news anchor, other information such as a current temperature, a chance of rain and a current time is added to captions at an upper part of the television screen, and current severe weather updates (in this instance, a hurricane) are also given in a moving banner below the above information at the top of the television screen.

With the above presentation approach, a viewer needs to be seated in front of the television in order to properly learn about the information provided through the television screen. Further, for viewers that favor different types of programs, only the one viewer holding a remote controller is given the privilege to decide a program to be viewed.

For example, assume that a user A viewing the main screen is watching a particular report on social news. At the time when paying much attention to the social news, the user A may not be aware of the weather information presented by the captions at the upper part of the television screen or the hurricane updates presented by the moving banner.

On the other hand, a user B, who may be quite concerned whether the hurricane affects work or school, is however prohibited from switching to a weather channel due to the lack of control over the remote controller. As a result, the user B can only learn about the hurricane updates through the moving banner.

Moreover, a number of news reports (e.g., ten different news reports) may be presented in turn by the moving banner. Due to the number of news reports and a fast moving speed of the moving banner, the user B may not be able to timely watch complete contents of the concerned news report, such that the user B is deprived from efficiently learning the concerned information.

In other words, users with different needs cannot be flexibly offered with concerned information by the above conventional information providing approach of the prior art television screen. Therefore, there is a need for a solution that satisfies the above user needs.

SUMMARY OF THE INVENTION

According to an aspect of the present invention, a playback method for a video/audio playback apparatus is provided. The playback method includes steps of: receiving a first playback data and a second playback data; converting first character information in the first playback data into a first audio signal; and simultaneously playing the first audio signal, and a second audio signal corresponding to the second playback data. The first audio signal and the second audio signal respectively correspond to a first playback language and a second playback language.

According to another aspect of the present invention, a video/audio playback apparatus is provided. The video/audio playback apparatus, signally connected to at least one signal source, includes: a receiving unit, signally connected to the at least one signal source, for receiving a first playback data and a second playback data; a control unit, electrically connected to the receiving unit, for converting first character information in the first playback data into a first audio signal; and a playback unit, electrically connected to the control unit, for simultaneously playing the first audio signal and a second audio signal corresponding to the second playback data. The first audio signal and the second audio signal respectively correspond to a first playback language and a second playback language.

The above and other aspects of the invention will become better understood with regard to the following detailed description of the preferred but non-limiting embodiments. The following description is made with reference to the accompanying drawings.

DETAILED DESCRIPTION OF THE INVENTION

Several embodiments of the present invention are to be described below for explaining how diversified information is presented to different users. In short, a concept of the present invention is to provide different users with preferred contents and play the preferred contents in accustomed languages.

According to an embodiment of the present invention, for example, a video/audio playback apparatus utilizes Chinese as the playback language for a user who desires Chinese as the playback language, English as the playback language for a user who desires English as the playback language, Spanish as the playback language for a user who desires Spanish as the playback language, and so forth.

Further, the video/audio playback apparatus of the present invention provides different languages for different information, and simultaneously plays the different information in different languages. For example, while a user A watches a Chinese television series, a user B is allowed to listen to CNN Internet news broadcasted in English and a user C is allowed to listen to stock trends in a moving banner read out in French. In a further application, the users are given options to adjust a volume and a speed of the playback information being watched or listened to.

Figure 2A:
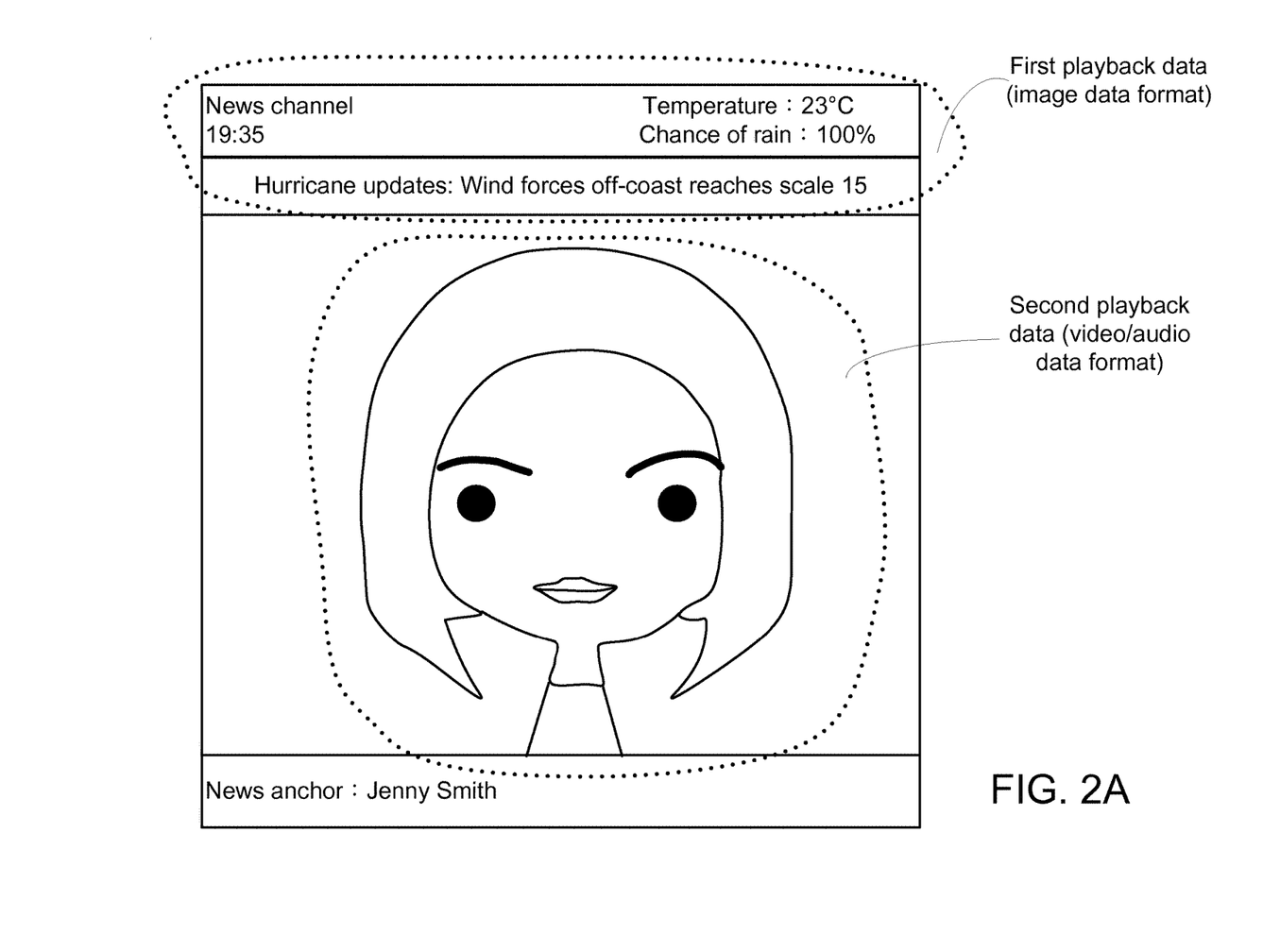
FIG. 2A is a schematic diagram of a displayed image of playback data in an image format and in a video/audio format from a shared signal source according to a first preferred embodiment of the present invention.

FIG. 2A shows a schematic diagram of a displayed image of playback data in an image format and in a video/audio format from a shared signal source according to a first preferred embodiment of the present invention. In this preferred embodiment, a television (i.e., a video/audio playback apparatus) receives messages including a news image, a moving banner, and captions from a television station.

In this preferred embodiment, the television image is divided into two playback data. A first playback data includes information of a current temperature and a current time at an upper part of the television screen as well as hurricane updates presented by the moving banner. A second playback data represents the image and sound of a news anchor broadcasting the news.

According to an embodiment of the present invention, apart from maintaining the image and sound of the news anchor broadcasting the news, characters of the captions and the moving banner are broadcasted in different languages. For example, while a user A watches the news anchor broadcasting social news in Chinese, a user B is allowed to listen to information of the current temperature, the current time and the hurricane updates broadcasted in English, Japanese or any other desired language.

According to an embodiment of the present invention, the video/audio playback apparatus further provides a translating function for the broadcast information. For example, the foregoing information including the current temperature, time and hurricane updates is first translated into Chinese, and is then broadcasted in Chinese. The desired translated language may be configured according to user preferences.

As a conclusion from parts of the captions and the moving banner on the television screen in FIG. 2A, these parts are in an image data format including characters. Therefore, in this preferred embodiment, a corresponding character recognition function is provided in response to the character contents embedded in the image data format. That is, character strings included in the captions and the moving banner are read by a character recognition (an optical character recognition) function.

Figure 2B:
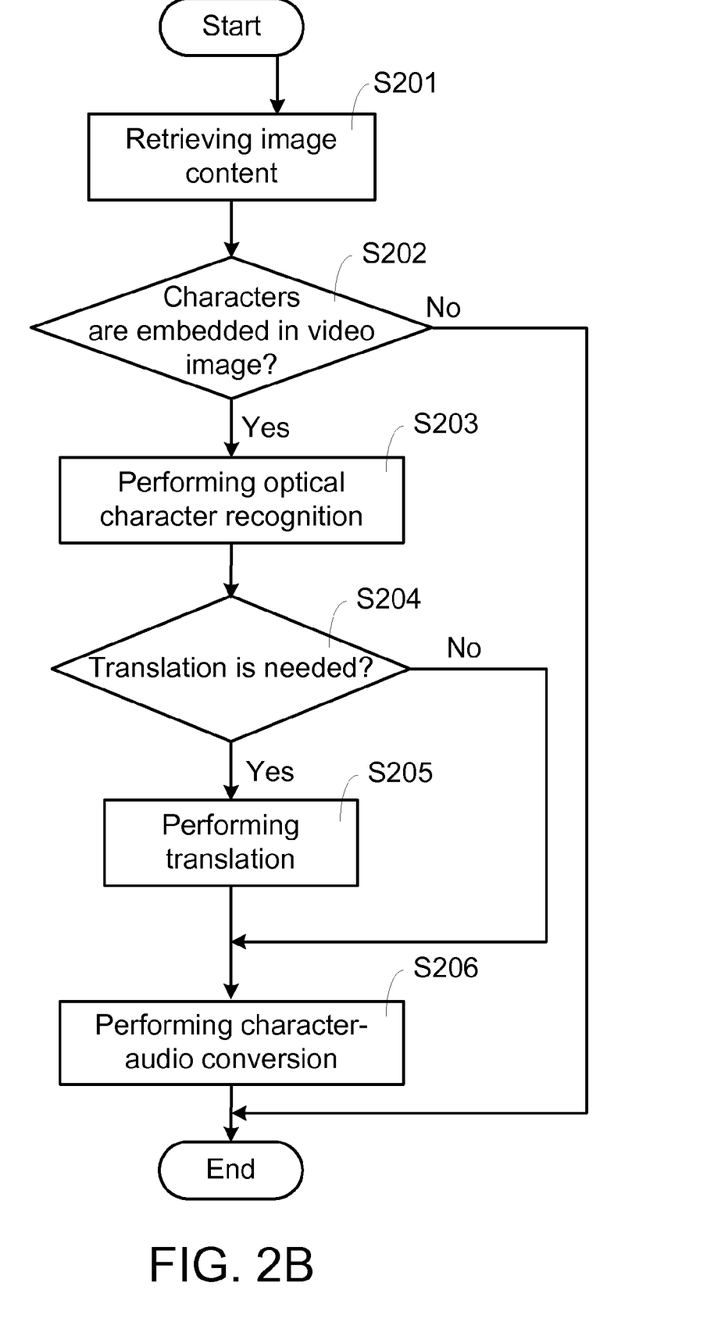
FIG. 2B is a flowchart of a process for capturing characters from an image on a television screen according to an embodiment of the present invention.

FIG. 2B shows a flowchart of a process for capturing characters from an image on a television screen according to an embodiment of the present invention.

In Step S201, a content of an image is retrieved. In Step S202, it is determined whether characters are embedded in the image. A subsequent step of recognition and audio playback is performed when a determination result of Step S202 is affirmative (i.e., characters are embedded in the image), or else the process ends in the absence of character information.

In Step S203, optical recognition is performed on the image embedded with characters. After recognizing the content of the character information, in Step S204, it is determined whether a translation process is to be performed according to whether a language represented by the character information is a user-desired playback language. For example, when a recognized result is Chinese whereas the user-desired playback language is English, a translation process is required.

When a result of Step S204 is affirmative, a translation process is performed in Step S205. In Step S206, after the translation process, a character-audio conversion is performed. That is, the information of the current temperature, the current time and the hurricane updates translated into English is played in English as the user-desired playback language.

Figure 3:
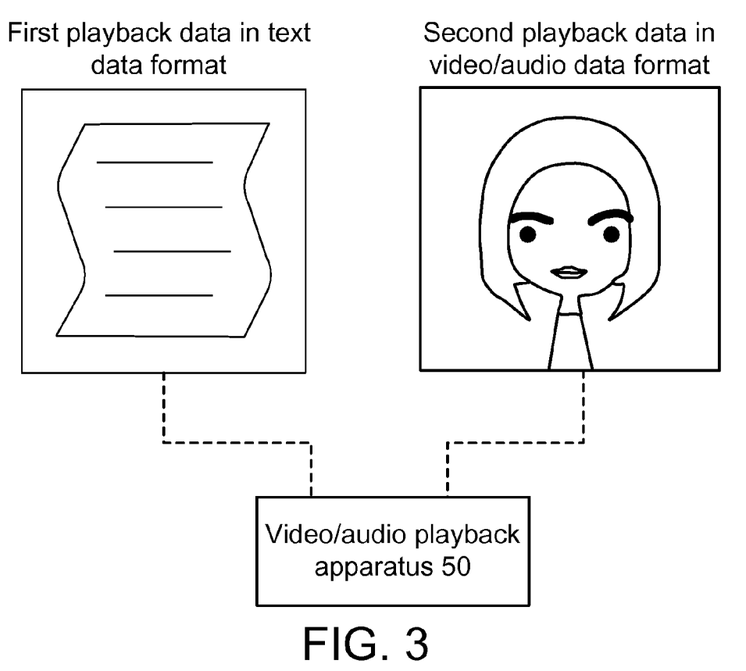
FIG. 3 is a schematic diagram of a displayed image of playback data in a text data format and in a video/audio data format from different signal sources according to a second preferred embodiment of the present invention

FIG. 3 shows a schematic diagram of a displayed image of playback data in a text data format and in a video/audio data format received from different signal sources according to a second preferred embodiment of the present invention. In this preferred embodiment, apart from receiving video and audio information provided by a common television channel, a video/audio playback apparatus may also receive webpage contents provided by a website.

Thus, while playing the content of a television screen, a video/audio playback apparatus 50 (see FIG. 5A) can also read characters in the webpage content through audio reading. According to an embodiment of the present invention, for example, assuming that original audio information of the television image is broadcasted in Japanese, a language for reading the webpage content may then be another language, e.g., English, French, or Spanish.

As a user A watches the television screen played in Japanese, a user B listens to the webpage content in another language and is hence unaffected by the contents of the television screen played in Japanese.

Further, a time point at which the video/audio playback apparatus 50 obtains the webpage content is not limited. That is, while playing the content of the television screen, the video/audio playback apparatus 50 may in real-time connect to the website to obtain the webpage content. Further, the video/audio playback apparatus 50 may also obtain the webpage content in advance. For example, the webpage content is pre-stored into an internal storage device and accessed while playing the content of the television screen.

Figure 4:
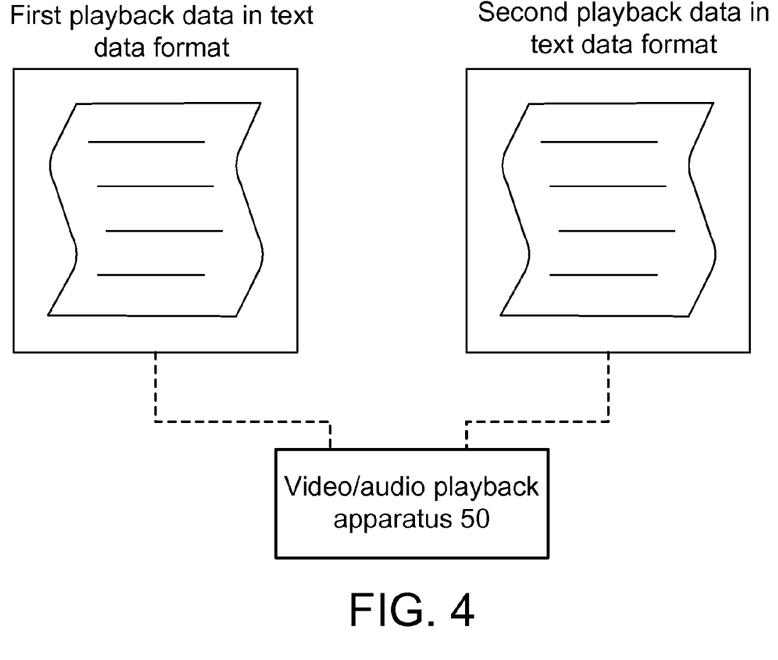
FIG. 4 is a schematic diagram of a displayed image of two sets of playback data both in a text data format from different signal sources according to a third preferred embodiment of the present invention.

FIG. 4 shows a schematic diagram of a displayed image of two sets of playback data both in a text data format received from different signal sources according to a third preferred embodiment of the present invention. In this embodiment, it illustrated that the data format adopted by the playback data can both be a text data format, e.g., a Japanese webpage obtained from the NHK website and an English webpage obtained from the CNN website.

After obtaining contents of the Japanese webpage and the English webpage, the video/audio playback apparatus 50 simultaneously plays the contents of the two webpages in Japanese and English (by a speaker). A user A who wishes to listen to the news on the NHK webpage may then listen to the Japanese news with the video/audio playback apparatus 50, and a user B who wishes to listen to the news on the CNN webpage may listen to the English news with the video/audio playback apparatus 50.

Figure 5A:
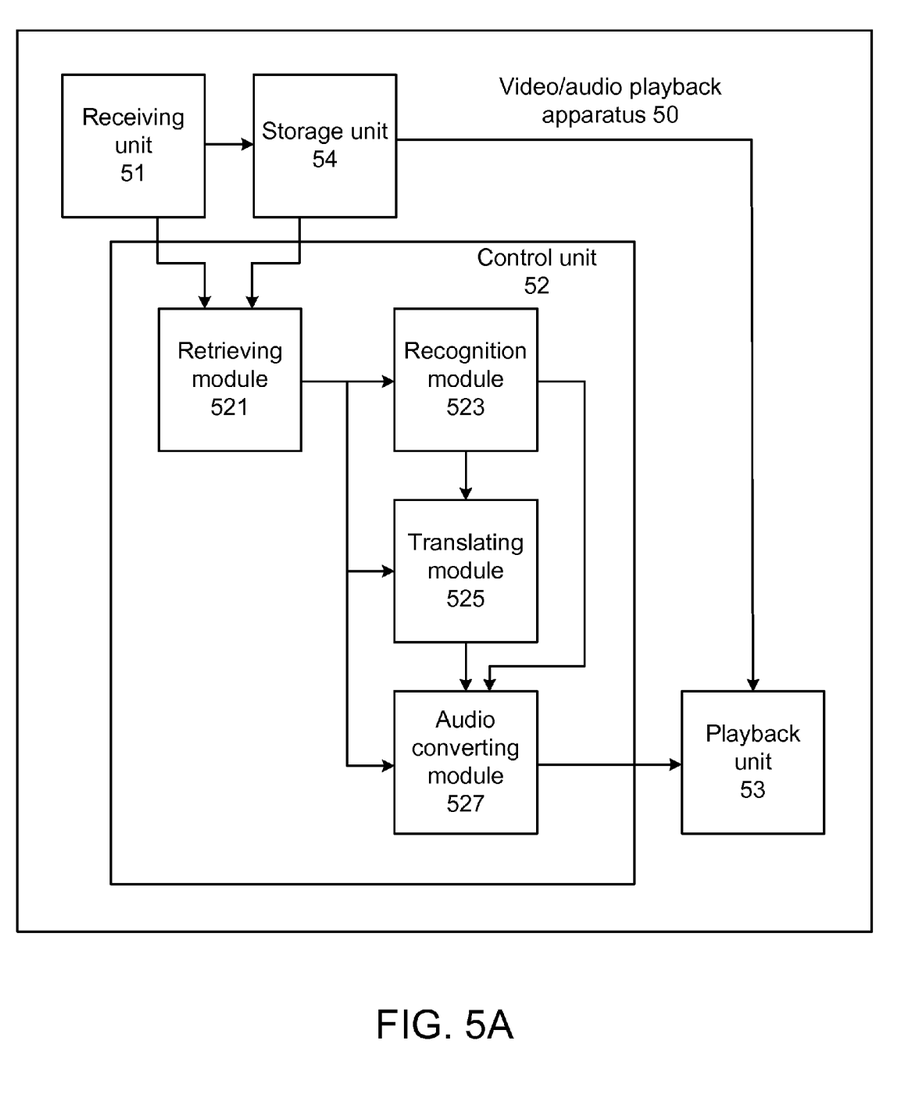
FIG. 5A is a block diagram of a video/audio playback apparatus according to an embodiment of the present invention.

FIG. 5A shows a block diagram of a video/audio playback apparatus according to an embodiment of the present invention. The video/audio playback apparatus 50 includes: a receiving unit 51, signally connected to a signal source provided by a telecommunication service provider or a network service provider; a control unit 52, electrically connected to the receiving unit 51; a playback unit 53, electrically connected to the control unit 52; and an optional internal/external storage unit 54, for storing playback data, among other information.

The receiving unit 51 receives a first playback data and a second playback data. The control unit 52 selectively converts the first playback data into a first audio signal through first character information according to a format of the first playback data, and selectively converts the second playback data into a second audio signal through second character information according to a format of the second playback data.

The playback unit 53 then simultaneously plays the first audio signal and the second audio signal. The first audio signal and the second audio signal respectively correspond to a first playback language and a second playback language.

The control unit 52 includes a retrieving module 521, a recognition module 523, and an audio converting module 527. The control unit 52 may further include a translating module 525.

The above modules perform similar processes on the first and second playback data. That is, the above modules perform processing and conversion according to the data formats of the playback data to provide audio signals required by the playback unit 53 for actual playback.

The retrieving module 521 is electrically connected to the receiving unit 51. When the playback data is in an image data format, the retrieving module 521 retrieves a plurality of corresponding text characteristics from the playback data. The recognition module 523 is electrically connected to the retrieving module 521, and recognizes and encodes the text characteristics to accordingly obtain the corresponding character information.

The retrieving module 521 and the recognition module 523 primarily serve for an optical character recognition (OCR) function. That is, when the playback data is in an image format, the characters in the image data format are retrieved and converted into a text data format.

It should be noted that the text data format is not limited to a specific format. For example, an ASCII code and a Unicode file adopting universal character sets can be implemented.

With the optical character recognition function, playback data in image files including JPG, GIF, TIFF, PNG, and BMP can be recognized by the control unit 52 to retrieve the characters therein. Alternatively, when the playback data is in a video/audio format such as MPEG2, MPEG4, and H.264, the images in the file are first retrieved, and the characters therein can then be further recognized.

The audio converting module 527 is electrically connected to the retrieving module 521 and the playback unit 53, and converts the character information obtained from recognition and the playback data in a text data format into audio signals.

The translating module 525 is electrically connected to the recognition module 523 and the audio converting module 527. The translated character information obtained after translating the character information by the translating module 525 is provided to the audio converting module 527, which then accordingly generates the audio signals to be played by the playback unit 53. The translating module 525 offers a user with more types of playback information. For example, when the characters in the first playback information is English, the first playback information may be translated into Chinese by the translating module 525, so that a user who desires Chinese as the playback language is allowed to listen to international news provided by international news media such as CNN and BBC.

The video/audio playback apparatus 50 may further selectively include a storage unit 54 electrically connected to the receiving unit 51. Desired playback information may be stored in the storage unit 54 in advance, and played when needed. For example, the storage unit 54 may also be built in the video/audio playback apparatus 50, or may be an external memory card or a USB portable disk.

The above modules and units may be implemented entirely as software or hardware, or partly by software and partly by hardware, based on system performance and application requirements.

According to the above preferred embodiments, a flowchart of a playback method for a video/audio playback apparatus may be concluded.

Figure 5B:
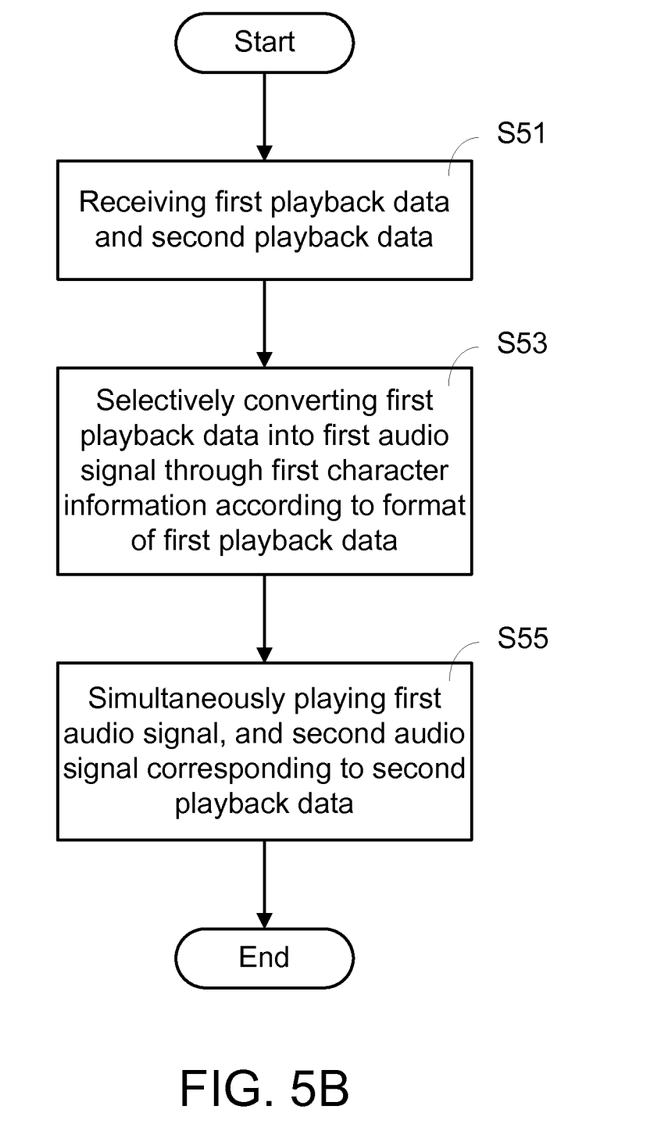
FIG. 5B is a flowchart of a playback method capable of playing several playback languages according to an embodiment of the present invention.

FIG. 5B shows a flowchart of a playback method capable of playing several playback languages according to an embodiment of the present invention. The method includes the following steps. In step S51, a first playback data and a second playback data are received. In Step S53, the first playback data is selectively converted into a first audio signal through first character information according to a format of the first playback data. In Step S55, the first audio signal and a second audio signal corresponding to the second playback data are simultaneously played. The first audio signal and the second audio signal respectively correspond to a first playback language and a second playback language.

In an embodiment of the present invention, a format of the first playback data is an image data format or a text data format, and the second playback data is a video/audio data format. Details of Step S53 are to be described below.

Data in form of an image data cannot typically be directly converted to an audio signal without significant processing. Therefore, for the first playback data in an image data format, the first character information is first retrieved and recognized from the first playback data, and is then converted into the first audio signal. That is to say, when the first playback data is in an image data format, Step S53 further includes steps of: performing image recognition and encoding on the first playback data to obtain the first character information; and converting the first character information into the first audio signal.

In certain cases, the first playback language selected by a user may not the same as the language adopted by the first character information. For example, a user may wish to listen to English as the first playback language and yet the first character information is in Spanish. Hence, the first character information in Spanish is translated into English, and the character information translated into English is then played by a speaker.

In the above situation, the result obtained from the optical character recognition (the first character information) cannot be directly played such that translation for the first character information may be needed. Correspondingly, the step of converting the first character information to the first audio signal includes steps of: translating the first character information; and playing the translated first character information by the first playback language to obtain the first audio signal.

Further, when the first playback data is in a text data format, the first playback data can be directly converted to the first audio signal without performing the step of image recognition in Step S53. Similarly, the first playback language selected by a user may not be the same as the language adopted by the first playback data. For example, the first playback language that a user wishes to listen to is Chinese; however the first playback data is downloaded from a Japanese website. Therefore, the first playback data played in the first playback language needs to be first translated into the translated first playback data to further obtain the first audio signal.

When the second playback data is not in a video/audio data format, similarly to the approach in Step S53, the second playback data may be selectively converted to the second audio signal through the second character information according to the format of the second playback data.

It should be noted that, based on actual requirements, the first playback language and the second playback language may be further configured by a user in the foregoing process. Although two types of playback data are utilized as examples in the abovementioned preferred embodiments, it should be noted that the number of playback data simultaneously played by the video/audio playback apparatus 50 is not limited to a specific number in actual applications.

More specifically, given that different types of playback languages can be provided in response to different types of playback data, the types and number of the playback data can be adjusted. For example, a first playback data is played by English as a first playback language, a second playback data is played by Japanese as a second playback language, and a third playback data is played by Chinese as a third playback language.

In an embodiment, the above video/audio playback method can be applied to various types of video/audio playback apparatuses 50. The video/audio playback apparatuses 50 may be digital televisions and set-up boxes, which are signally connected to a at least one signal source provided by a television signal provider or a network service provider through diversified wired and wireless transmission means.

It should be noted that the at least one signal source means that the sources of the first playback data and the second playback data are not limited. For example, when the signal source is a shared signal source simultaneously providing the first playback data and the second playback data, the signal source may be a television station, and the first playback data and the second playback data may respectively be an image of a news anchor broadcasting the news and information in a moving banner.

Further, when the signal sources are a first signal source and a second signal source respectively providing the first playback data and the second playback data, the video/audio playback apparatus 50 is allowed to simultaneously play a reported article provided by a news website and a television series received from the television station.

In an embodiment of the present invention, the first playback data and the second playback data may be in a same format or different formats. It should be noted that, when the second playback data is a main display image provided by a television station, the video/audio playback apparatus is able to obtain the second audio signal without additional conversion since the second playback data already includes video and audio, and so the original audio data included in the second playback data can be directly played.

Further, an approach of obtaining the playback data is not limited. For example, the video/audio playback apparatus in real-time receives the playback data as a user watches or listens to the playback data. Alternatively, contents of the playback are obtained by the video/audio playback apparatus and stored in advance, and the contents of stored playback data are played when desired.

Between the two approaches above, the former is referred to as a real-time mode, and the latter is referred to as a batch mode. In practice, the first playback data may be obtained in a batch mode, and the second data may be obtained in a real-time mode.

According to the above preferred embodiments, it is demonstrated that, a video/audio playback apparatus of the present invention, such as a television, a set-up box, a computer, a personal digital assistant (PDA), and a cell phone, is capable of playing audio signals in different playback languages according to user preferences. Different playback data may be individually played, and so a playback speed and a corresponding playback language of the audio signals can also be configured and adjusted according to user preferences.

Thus, a plurality of users are allowed to individually listen to concerned information containing playback contents coming from different sources at the same time. Therefore, the playback method and apparatus of the present invention offers advantages of convenient and flexible applications.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A playback method, for a video/audio playback apparatus, comprising:
   receiving a first playback data and a second playback data;
   converting first character information in the first playback data to a first speech data; and
   simultaneously playing the first speech data and a second-speech data corresponding to the second playback data, wherein the second speech data is not a translation result of the first speech data;
   wherein, the first and the second speech data respectively correspond to a first playback language and a second playback language.

2. The playback method according to claim 1, wherein the first playback data is in a first image data format.

3. The playback method according to claim 2, wherein the step of converting the first character information in the first playback data to the first speech data comprises:
   performing optical character recognition on the first playback data to obtain the first character information; and
   converting the first character information into the first speech data.

4. The playback method according to claim 3, wherein the step of converting the first character information into the first speech data comprises:
   translating the first character information; and
   playing the translated first character information by the first playback language to obtain the first speech data.

5. The playback method according to claim 1, wherein the step of converting the first character information in the first playback data into the first speech data directly converts the first character information in the first playback data into the first speech data.

6. The playback method according to claim 5, wherein the step of converting the first playback data into the first speech data comprises:
   translating the first character information; and
   playing the translated first character information by the first playback language to obtain the first speech data.

7. The playback method according to claim 1, wherein the first playback data and the second playback data are provided by a shared signal source, or respectively provided by a first signal source and a second signal source.

8. The playback method according to claim 7, wherein the shared signal source, the first signal source and the second signal source are provided by a television signal provider and/or a network service provider.

9. The playback method according to claim 1, further comprising:

converting second character information in the second playback data into the second speech data.

10. The playback method according to claim 1, further comprising:
setting a type of the first playback language.

11. A video/audio playback apparatus, signally connected to at least one signal source, comprising:
a receiving unit, signally connected to the at least one signal source, configured for receiving a first playback data and a second playback data;
a control unit, configured for converting first character information in the first playback data into a first speech data; and
a playback unit, configured for simultaneously playing the first speech data, and a second speech data corresponding to the second playback data, wherein the second speech data is not a translation result of the first speech data;
wherein, the first speech data and the second speech data respectively correspond to a first playback language and a second playback language.

12. The playback apparatus according to claim 11, wherein the first playback data is in a first image data format.

13. The playback apparatus according to claim 12, wherein the control unit comprises:
a retrieving module, configured for obtaining a plurality of text characteristics from the first playback data; and
a recognition module, configured for performing optical character recognition on the text characteristics to obtain the first character information; and
an audio converting module, configured for converting the first character information into the first speech data.

14. The playback apparatus according to claim 13, wherein the control unit further comprises:
a translating module, configured for translating the first character information and providing the translated first character information to the audio converting module to allow the audio converting module to accordingly obtain the first speech data.

15. The playback apparatus according to claim 11, wherein the control unit comprises:
an audio converting module, configured for converting the first character information in the first playback data into the first speech data.

16. The playback apparatus according to claim 15, wherein the control unit further comprises:
a translating module, configured for translating the first character information in the first playback data and providing the translated first character information to the audio converting module to allow the audio converting module to accordingly obtain the first speech data.

17. The playback apparatus according to claim 11, wherein the at least one signal source is a shared signal source providing the first playback data and the second playback data, or is a first signal source and a second signal source respectively providing the first playback data and the second playback data.

18. The playback apparatus according to claim 11, wherein the control unit converts second character information in the second playback data into the second speech data.

19. The playback apparatus according to claim 18, wherein the second playback data is in a video/audio data format, a second image data format, or a second text data format.

20. The playback apparatus according to claim 19, wherein the second speech data is original audio data in the second playback data when the second playback data is in the video/audio data format.

21. The playback method according to claim 1, wherein the first playback data is in a first text data format.

22. The playback method according to claim 11, wherein the first playback data is in a first text data format.

* * * * *